L. W. DAVIS.
UNIVERSAL JOINT.
APPLICATION FILED MAY 29, 1919.

1,334,439.

Patented Mar. 23, 1920.

Inventor:
L. W. Davis,

Fred P. ____
Attorney.

UNITED STATES PATENT OFFICE.

LEWIS W. DAVIS, OF SEATTLE, WASHINGTON.

UNIVERSAL JOINT.

1,334,439.  Specification of Letters Patent.  Patented Mar. 23, 1920.

Application filed May 29, 1919. Serial No. 300,517.

*To all whom it may concern:*

Be it known that I, LEWIS W. DAVIS, a citizen of the United States, residing at Seattle, in the county of King and State of Washington, have invented certain new and useful Improvements in Universal Joints, of which the following is a specification.

This invention relates to an improvement in universal joints for connecting sections of a shaft, in order to permit driving coöperation between said sections without regard to variations from the alined relation of such sections.

The improved universal joint embodies head sections for the adjacent ends of the shaft which sections have opposed connections with a series of flexible members adapted for slight relative movement, the head sections are further connected by a joint permitting a non-alined relation of the shafts without being separated, the joint being constructed to present a minimum contact between the relatively movable parts in a play of the shafts.

In the drawings:—

Figure 1:
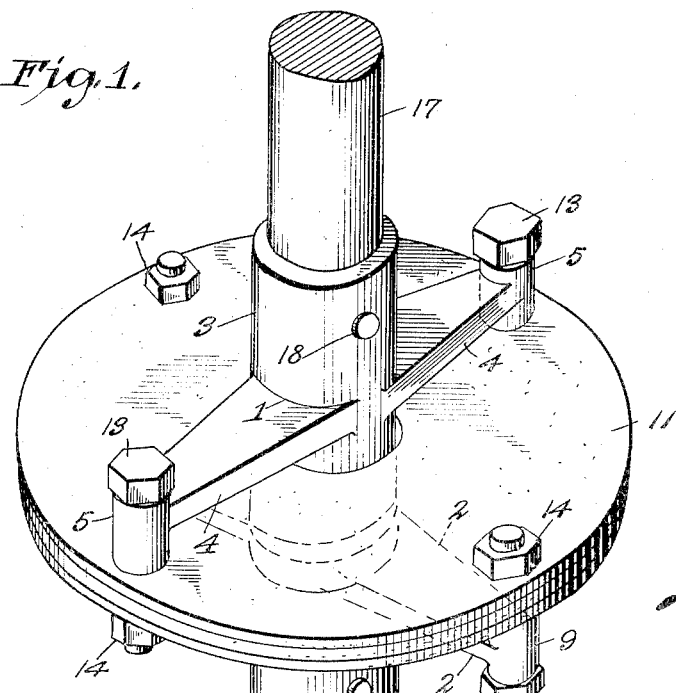
Figure 1 is a perspective view of the improved universal joint.
Figure 2:
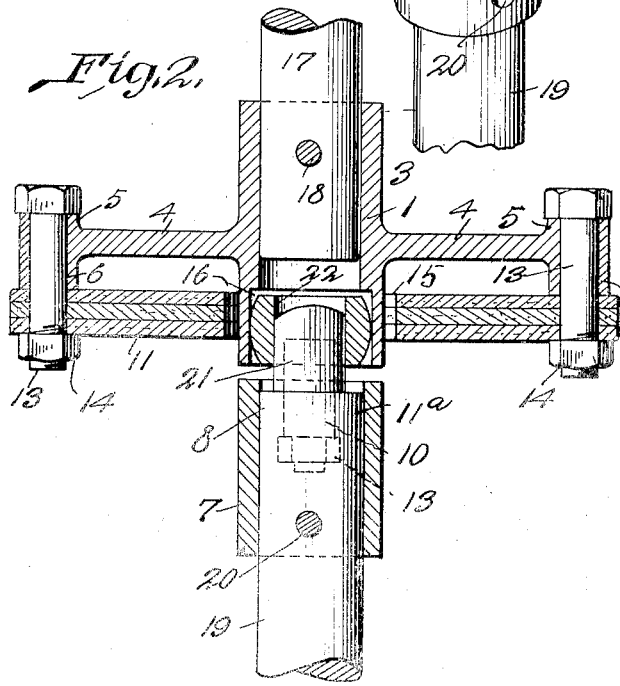
Fig. 2 is a longitudinal central section of the same.

The improved universal joint is made up of two joint heads, 1 and 2. The head 1 comprises a central sleeve like section 3, from which intermediate its ends extend opposite arms 4 terminating in bosses 5 formed with openings 6.

The head 2 also includes a sleeve like member 7, from which approximately at one end thereof extend opposed arms 8, terminating in bosses 9, formed with openings 10.

The arms 4 and 8 of the respective heads, are of similar length, and the bosses 5 and 9 are substantially identical.

Figure 3:
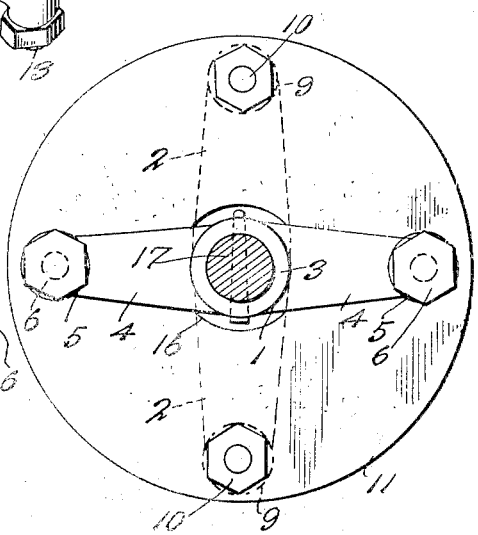
Fig. 3 is an end view of the same, the shafts being omitted, and the underlying parts shown in dotted outline.

In assembled relation the heads are arranged with the members 3 and 7 in alinement, with the arms 8 arranged at right angles to the arm 4 as clearly indicated in Fig. 3. A series of disks 11, preferably of leather or some other material are arranged between the heads, these disks having openings 12 to aline with the respective openings 6 and 10 of the bosses of the heads. Of course the bosses 6 are arranged on one side of the disks while the bosses 9 are arranged on the other side of the disks. Bolts 13 are passed through the alined openings of the bosses and disks, and are provided beyond the disks with nuts 14 to secure the heads to the disks and to each other.

As the arms 4 project from the member 3 of head 1 between the ends of said member, such member projects beyond the plane of the disks, and the latter are provided with central openings 15, of a diameter greater than that of the member 3 to permit such passage of the member, and at the same time to permit a limited independent play of the disks with respect with each other, without interference. In other words the disks are not held in such close contact one with another as to prevent a slight independent movement, and this independence provides the necessary flexibility for a true driving connection when the shafts are out of alinement.

That portion of the member 3 from one edge of the disks to the free end of the member, is enlarged at 16, concentric with the bore of said member, this enlargement being however truly cylindrical. One of the shaft sections to be connected, as the driving section 17, is fitted snugly within the bore of member 3 and secured by a transverse pin 18. The other shaft section 19 is similarly fitted within the bore of member 7 of head 2, and secured by a transverse pin 20. The shaft section 19 however, extends beyond the relatively inner end of the member 7 and is terminally reduced at 21 to receive a ball like terminal 22, which terminal 22 is centrally cored to accurately fit the extension 21, to which it is rigidly secured.

The member 22 constitutes the guiding connection between the shaft sections while the disks 11 constitute the driving connection. The play of the ball like member in the straight wall socket permits a relative movement of the shaft sections, while the right angled relation of the arms of the respective heads compensate for such movement.

An important feature of the present invention resides in the coöperation of the external wall of member 22 with the wall of socket 16. The socket wall is truly cylindrical, while the wall of the member is substantially spherical. This insures that in all relative positions of said member within the socket, the contact is substantially on a single line, and not throughout any appreciable service area. This arrangement tends to a minimum of heating and friction as compared with the usual ball and socket connection.

Having thus described the invention, what is claimed as new is:—

A universal joint comprising a pair of heads, each having a centrally disposed socket and diametrically arranged arms, a plurality of superimposed flexible disks between the pair of heads, bolts extending through the arms and flexible disks, one of the sockets of the heads being extended to project through an opening in the disks, the extended portion of the socket having its bore enlarged to form at one end a shoulder, the companion socket being wholly beyond and out of the plane of the disks, a shaft extending through said companion socket, said shaft having a reduced extension which reaches into the enlarged portion of the bore in the extension of the socket, a spherical element secured to the extension of the shaft, the spherical surface of the element engaging the straight wall of the enlarged bore and tiltable and slidable therein, the spherical element being retained in the enlarged portion of the bore between the shoulder of one socket and the end of the adjacent socket.

In testimony whereof I affix my signature.

LEWIS W. DAVIS.